United States Patent
Bobbitt et al.

(10) Patent No.: US 8,165,349 B2
(45) Date of Patent: Apr. 24, 2012

(54) ANALYZING REPETITIVE SEQUENTIAL EVENTS

(75) Inventors: Russell Patrick Bobbitt, Pleasantville, NY (US); Quanfu Fan, Somerville, MA (US); Arun Hampapur, Norwalk, CT (US); Frederik Kjeldsen, Poughkeepsie, NY (US); Sharathchandra Umapathirao Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 12/325,176

(22) Filed: Nov. 29, 2008

(65) Prior Publication Data

US 2010/0135528 A1 Jun. 3, 2010

(51) Int. Cl.
*G06K 9/00* (2006.01)
*H04W 4/00* (2009.01)

(52) U.S. Cl. .................. 382/103; 382/291; 370/328

(58) Field of Classification Search .......... 382/100–103, 382/106–107, 113–115, 137–140, 149, 155, 382/168, 173, 178, 181, 199, 232, 254, 274, 382/276, 282–295, 305, 312; 235/383, 385; 340/572.1; 370/328
See application file for complete search history.

(56) References Cited

U.S. PATENT DOCUMENTS

| | | | |
|---|---|---|---|
| 5,745,036 A * | 4/1998 | Clare | 340/572.1 |
| 5,965,861 A | 10/1999 | Addy et al. | |
| 6,236,736 B1 | 5/2001 | Crabtree et al. | |
| 6,847,393 B2 | 1/2005 | Ashe et al. | |
| 7,049,965 B2 | 5/2006 | Kelliher et al. | |
| 7,080,778 B1 * | 7/2006 | Kressin et al. | 235/385 |
| 7,100,824 B2 * | 9/2006 | Ostrowski et al. | 235/383 |
| 7,118,026 B2 | 10/2006 | Harris et al. | |
| 7,246,745 B2 * | 7/2007 | Hudnut et al. | 235/383 |
| 7,416,118 B2 | 8/2008 | Throckmorton et al. | |
| 7,516,888 B1 | 4/2009 | Kundu et al. | |
| 7,631,808 B2 * | 12/2009 | Kundu et al. | 235/383 |
| 7,646,745 B2 * | 1/2010 | Caldwell et al. | 370/328 |
| 7,646,887 B2 | 1/2010 | Goncalves et al. | |
| 7,780,081 B1 | 8/2010 | Liang | |

(Continued)

FOREIGN PATENT DOCUMENTS

WO WO/2006/105376 10/2006

OTHER PUBLICATIONS

Moeslund, et al., "A survey of advances in vision-based human motion capture and analysis," Computer Vision and Image Understanding, pp. 90-126, 2006.

(Continued)

*Primary Examiner* — Seyed Azarian
(74) *Attorney, Agent, or Firm* — Ryan, Mason & Lewis, LLP (57) ABSTRACT

Techniques for analyzing one or more sequential events performed by a human actor to evaluate efficiency of the human actor are provided. The techniques include identifying one or more segments in a video sequence as one or more components of one or more sequential events performed by a human actor, integrating the one or more components into one or more sequential events by incorporating a spatiotemporal model and one or more event detectors, and analyzing the one or more sequential events to analyze behavior of the human actor.

22 Claims, 6 Drawing Sheets

U.S. PATENT DOCUMENTS

| | | | |
|---|---|---|---|
| 7,957,565 B1* | 6/2011 | Sharma et al. | 382/115 |
| 2005/0146605 A1 | 7/2005 | Lipton et al. | |
| 2005/0162515 A1 | 7/2005 | Venetianer et al. | |
| 2006/0243798 A1 | 11/2006 | Kundu et al. | |
| 2006/0283943 A1 | 12/2006 | Ostrowski et al. | |
| 2007/0057049 A9 | 3/2007 | Kundu et al. | |
| 2007/0272734 A1 | 11/2007 | Lipton et al. | |
| 2008/0100704 A1 | 5/2008 | Venetianer et al. | |
| 2008/0226129 A1 | 9/2008 | Kundu et al. | |
| 2009/0290802 A1 | 11/2009 | Hua et al. | |

OTHER PUBLICATIONS

Bobick, et al., "The recognition of human movement using temporal templates," IEEE PAMI, vol. 23, pp. 257-267, 2001.

Efros, et al., "Recognizing action at a distance," in ICCV03, 2003, pp. 726-733.

Urtasun, et al., "Priors for people tracking from small training sets," in ICCV05, 2005, pp. 403-410.

Shi, et al., "Propagation networks for recognition of partially ordered sequential action," in CVPR04, 2004, pp. 862-869.

Laxton, et al., "Leveraging temporal, contextual and ordering constraingt for recognizing complex activities," in CVPR07, 2007.

Laptev, et al., "Space-time interest points," in ICCV, 2003, pp. 432-439.

Ke, et al., "Efficient visual event detection using volumetric features," in ICCV05, 2005.

Dollar, et al., "Behavior recognition via sparse spatio-temporal features." in Visual Surveillance and Performance Evaluation of Tracking and Surveillance, 2005. 2nd joint IEEE International Workshop on, 2005. pp. 65-72.

D. G. Lowe, "Distinctive image features from scale-invariant keypoints," IJCV04, vol. 60, pp. 91-110, 2004.

Filipovych, et al., "Recognizing primitive interactions by exploring actor-object states," in CVPR08, 2008.

Marszalek, et al., "Learning realistic human actions from movies," in CVPR08, 2008.

Duong, et al., "Activity recognition and abnormality detection with the switching hidden semi-markov model," in CVPR05, 2005, pp. 1709-1718.

Ryoo, et. al., "Recognition of composite human activities through context-free grammar based representation," in CVPR, 2006, pp. 1709-1718.

Andrews, et al., "Multiple instance learning with generalized support vector machines," Artificial Intelligence, pp. 943-944, 2002.

Boiman, et al., "Detecting Irregularities in Images and in Video", ICCV, 2005.

Hongeng, et al., "Large-scale event detection using semi-hidden Markov models", ICCV, 2003.

Mahajan, et al., "A Framework for Activity Recognition and Detection of Unusual Activities", ICVGIP, 2004.

Oliver, et al., "Layered representations for human activity recognition", Int'l Conf. on Multimodal Interfaces, 2002.

C. Pinhanez, "Representation and Regognition of Action in Interactive Spaces", Ph.D. Thesis, 1999.

Rao, et al., "View-Invariant Representation anad Recognition of Actions", IJCV, vol. 50, Issue 2, 2002.

Toussaint, et al., "Motion Segmentation Using Interface in Dynamic Bayesian Networks", BMVC, 2007.

Turaga, et al., "Machine Recognition of Human Activities: A Survey", IEEE T-CSVT, 2008.

Wong et al., "Learning Motion Categories using both Semantic and Structural Information", CVPR, 2007.

R. Kjeldsen, "Polar Touch Detection", Interact, 2007 Beijing, China, Jul. 2007.

Felzenszwalb, et al., "Pictorial structures for object recognition", IVCV, 2005.

Ramanan, et al., "Trackinig People by Learning their Appearance", PAMI, 2007.

* cited by examiner

ANALYZING REPETITIVE SEQUENTIAL EVENTS

CROSS-REFERENCE TO RELATED APPLICATIONS

The present application is related to U.S. patent application entitled "Detecting Primitive Events at Checkout," identified by Ser. No. 12/325,177 and filed concurrently herewith, the disclosure of which is incorporated by reference herein in its entirety.

Additionally, the present application is related to U.S. patent application entitled "Location-Aware Event Detection," identified by Ser. No. 12/325,178, and filed concurrently herewith, the disclosure of which is incorporated by reference herein in its entirety.

The present application is related to U.S. patent application entitled "Automatically Calibrating Regions of Interest for Video Surveillance," identified by Ser. No. 12/262,446, and filed on Oct. 31, 2008, the disclosure of which is incorporated by reference herein in its entirety.

Also, the present application is related to U.S. patent application entitled "Generating an Alert Based on Absence of a Given Person in a Transaction," identified by Ser. No. 12/262,454, and filed on Oct. 31, 2008, the disclosure of which is incorporated by reference herein in its entirety.

The present application is related to U.S. patent application entitled "Using Detailed Process Information at a Point of Sale," identified by Ser. No. 12/262,458, and filed on Oct. 31, 2008, the disclosure of which is incorporated by reference herein in its entirety.

Additionally, the present application is related to U.S. patent application entitled "Creating a Training Tool," identified by Ser. No. 12/262,467, and filed on Oct. 31, 2008, the disclosure of which is incorporated by reference herein in its entirety.

FIELD OF THE INVENTION

Embodiments of the invention generally relate to information technology, and, more particularly, to retail loss prevention and product quality assurance.

BACKGROUND OF THE INVENTION

Repetitive sequential human activity includes repeated events, each of which is a combination of sub-actions (primitives) with certain spatial and temporal constraints. Such activities are often observed in workplaces where repeated tasks need to be performed, in which each task can also include a specific set of ordered steps. For instance, in a grocery store, a characteristic sequential action performed by a cashier includes obtaining an item from the lead-in belt, presenting the item to the barcode scanner for pricing and depositing the item onto the take-away belt for bagging. Another example can include an assembly line at a plant (for example, an automobile plant) where a worker repeatedly integrates multiple parts in order before passing the assemblage to the next process in the chain.

Effective analysis of repetitive sequential activities can have broad applications in many contexts, such as workplace safety, retail fraud detection and product quality assurance. In an assembly line example, defective products are often the result of incorrect order of assembly. In such a case, accurate recognition of worker activities can assist in the quality assurance process. In another example, there is a prevalent type of fraud in retail stores that is the direct result of improper behavior on the part of the cashier. In such a situation, fraud occurs when the cashier passes an item through the checkout lane without actually registering it in the purchase list. These actions can be called fake scans and are also referred to as sweethearting. Sweethearting is a serious problem in the retail industry and can cause significant revenue shrinkage.

Existing approaches for human activity recognition are primarily based on graphical models such as, for example Finite State Machines (FSM), Hidden Markov Models (HMM), Context-Free Grammar (CFG) and Dynamic Bayesian Networks (DBN). However, such approaches cannot handle the issue of overlap between primitives. Some approaches for detecting fake scans include validation of motion flow in the transaction area using temporal constraints. Such approaches, however, result in a high false positive rate.

SUMMARY OF THE INVENTION

Principles and embodiments of the invention provide techniques for analyzing repetitive sequential events. An exemplary method (which may be computer-implemented) for analyzing one or more sequential events performed repeatedly by a human actor to ensure legitimate human behaviors at workplaces such as a retail checkout station or an assembly line in a factory, according to one aspect of the invention, can include steps of identifying one or more segments in a video sequence as one or more components of one or more sequential events performed by a human actor, integrating the one or more components into one or more sequential events by incorporating a spatiotemporal model and one or more event detectors, and analyzing the one or more sequential events to analyze behavior of the human actor.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include recognizing repetitive sequential events performed by human actors with strong temporal dependencies and potential parallel overlap. One or more embodiments of the invention include incorporating sub-event (or primitive) detectors and a spatiotemporal model for sequential event changes. One can integrate primitives into a set of sequential events where strong temporal constraints are imposed on the ordering of the primitives. In particular, the combination process is approached as an optimization problem. A specialized Viterbi algorithm can be used to learn and infer the target sequential events and handle the event overlap simultaneously.

As described herein, repetitive sequential human activities are composed of repeated events, each of which is a combination of sub-actions (primitives) with certain spatial and temporal constraints. These activities are often observed in workplaces such as assembly lines and retail checkout stations and effective analysis of repetitive sequential activities has broad applications in many contexts, such as workplace safety, retail fraud detection and product quality assurance.

Repetitive sequential events exhibit a number of unique characteristics that are distinctive from other types of repeated human actions, such as walking and reading a book. First, in repetitive sequential events, there are strong spatiotemporal constraints imposed on the primitives. The actor typically operates within a relatively confined region and must perform the action quickly. In other types of repetitive actions, such constraints are often loosely enforced. For example, book reading involves repeated page flipping with random actions in between that do not have strong associations. Second, repetitive sequential events may involve temporal overlap (for example, a cashier scans an item while at the same time picking another item up). Such overlap is not possible in other activities, such as walking, where each action must be completed before the next one begins, and thus poses much greater challenges in the task of recognition.

As such, one or more embodiments of the invention combine primitive detectors with a spatiotemporal model for sequential event changes. The recognition task can include selecting a set of target sequential events from a large pool of candidates formed by the primitives detected. The selection process is then formulated as an optimization problem where the temporal and spatial constraints between primitives are leveraged. Additionally, a modified Viterbi algorithm can be applied to effectively find an optimal set of sequential events close to the genuine events. The issue of overlap is resolved in the optimization by only searching sequential events without overlap.

As noted above, repetitive human actions are often observed in scenarios like retail checkout stations and factory assembly lines. Such human activity can be considered as a set of repeated sequential events (or visual work units), each of which is composed of a sequence of relatively isolated and separable primitives with strong spatiotemporal constraints. While a strict ordering is demanded between primitives, two consecutive work units may overlap to an arbitrary degree. This overlap comes as a natural byproduct of the rapid and repetitive nature of the activity.

One or more embodiments of the invention include grouping primitives into a set of repeated sequential events of interest. One can group the primitives into a large set of valid candidates for the sequential event of interest. By doing so, the overlap problem is resolved by considering the temporal orderings of the corresponding primitives in consecutive sequential events. Also, one can use a Viterbi-like algorithm for selecting the most likely set of sequential events from the large pool of candidates for representing the data.

One or more embodiments of the invention also include sequential event representation. This can include providing a general graphical representation for a sequential event. Let $e_t^k$ be the k-th primitive in a sequential event that occurs at time t. A sequential event S is defined as a temporally ordered set of primitives $\{e_{t_1}^1, e_{t_2}^2, \ldots, e_{t_n}^n\}$ such that $t_1 < t_2 < \ldots < t_n$. For the purpose of clarity, one can sometimes omit the superscript k in the text.

Figure 1:
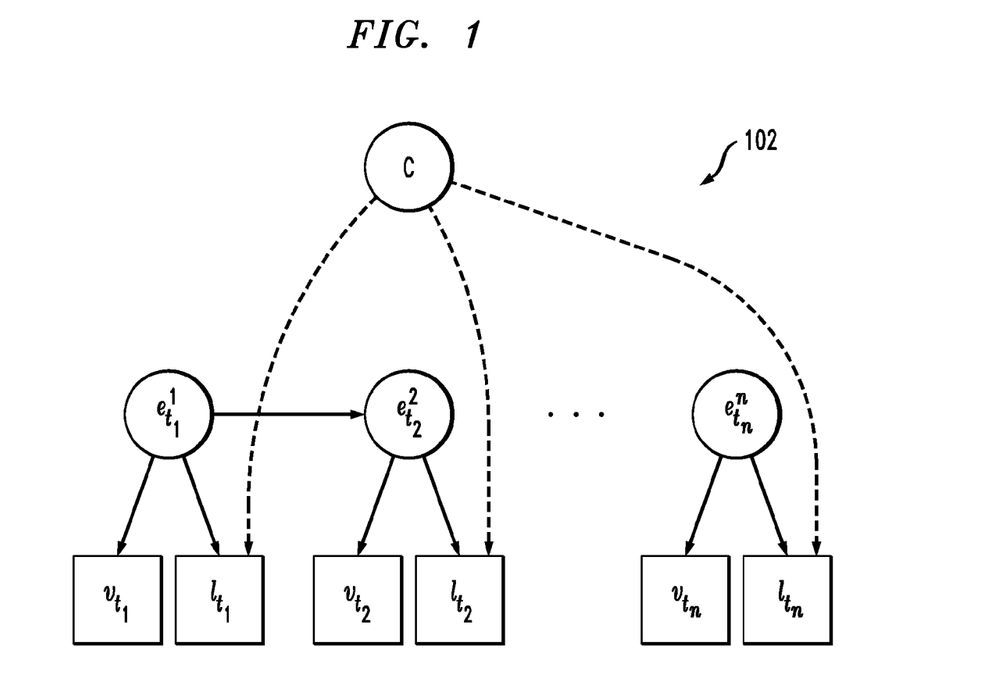
FIG. 1 is a diagram illustrating a graphical representation of a sequential event with n primitives, according to an embodiment of the present invention.

The sequential event can be represented as a graph. FIG. 1 is a diagram illustrating a graphical representation of a sequential event with n primitives 102, according to an embodiment of the present invention. As illustrated in FIG. 1, a primitive $e_{t_i}$ in a sequential event S is associated with an appearance node $v_{t_i}$ that represents the visual information, and a location node $l_{t_i}$ that denotes the spatial location of where the primitive occurs. The node C is a spatial model that places spatial constraints on the primitives. The primitives in a sequential event follow a Markovian model, such that the probability of S under the observation $O=(v, l)$ is given by, $$p(O \mid S) \alpha p(v \mid S) p(l \mid S) = p(v_{t_i} \mid e_{t_i}) \prod_2^n p(v_{t_i} \mid e_{t_i}) p(e_{t_i} \mid e_{t_{i-1}}) \cdot \prod_1^n p(l_{t_i} \mid e_{t_i}),$$

where $v = \{v_{t_1}, v_{t_2}, \ldots, v_{t_n}\}$ and $l = \{l_{t_1}, l_{t_2}, \ldots, l_{t_n}\}$ represent the visual cues and spatial information respectively. Here, $p(v_{t_i} \mid e_{t_i})$ is the appearance likelihood model for the primitive $e_{t_i}$, while $p(l_{t_i} \mid e_{t_i})$ is a spatial likelihood model for $e_{t_i}$. Term $p(e_{t_i} \mid e_{t_{i-1}})$ is the transition probability from primitive et to primitive $e_{t_i}$.

Also, the techniques described herein include building sequential events. Assume there are n sets of primitives $\{E_1, E_2, \ldots, E_n\}$ detected in a video sequence, where $E_m$ is a set of primitives with a specific type m (for example, all possible pickups in the cashier scenario). Thus, a candidate sequential event S can be formed by selecting a primitive from each set with temporal order. All such candidates are considered by enumerating samples in $\{E_1, E_2, \ldots, E_n\}$. In particular, one can represent all the candidates starting from a primitive $e_{t_i}^1 \in E_1$ by a tree rooted at $e_{t_i}^1$, which can be referred to as a sequence tree denoted by Tr(i, :). In such a tree, any node at the j-th level is only selected from set $E_j$ and all the children of the node occur in later primitive sets. This way, each path from the root of the tree to a leaf node corresponds to a candidate for a sequential event S.

Figure 2:
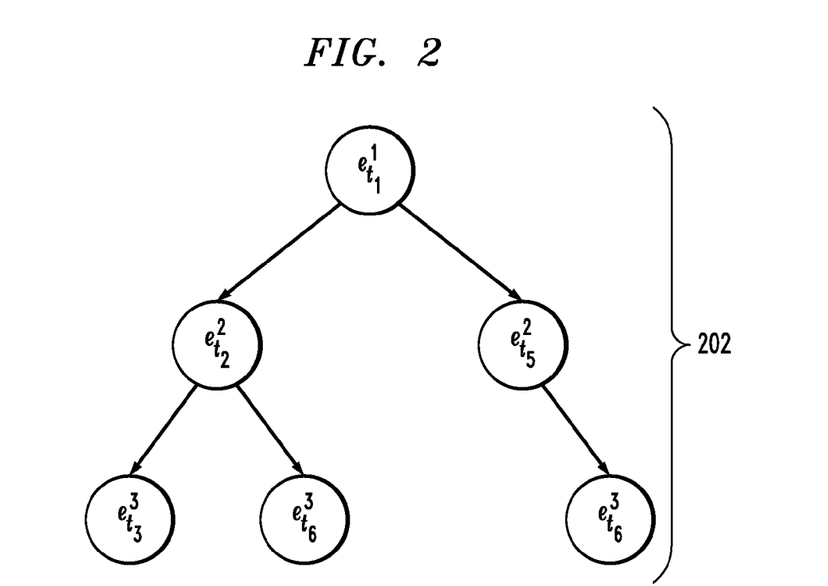
FIG. 2 is a diagram illustrating a sequence tree representing a portion of potential sequential events with three primitives, according to an embodiment of the present invention.

For example, FIG. 2 is a diagram illustrating a sequence tree representing a portion of potential sequential events with three primitives 202, according to an embodiment of the present invention. $\{e_{t_1}^1, e_{t_2}^2, e_{t_3}^3, e_{t_4}^1, e_{t_5}^2, e_{t_6}^3\}$ is a set of primitive events detected in a video sequence. All candidates originate from primitive $e_{t_1}$.

The number of sequential event candidates generated in such a technique grows exponentially with the number of primitives. To manage the sequential event set size, heuristics can be applied to reduce the number of candidates dramatically. For instance, simple temporal constraints like requiring that two consecutive events occur within a specified time interval could prune out many impossible combinations.

The exhaustive combination scheme described above yields a great number of candidate sequential events. However, the majority of these are spurious, especially when the results of primitive detection are noisy. As such, one or more embodiments of the invention select a small set of sequential events that best match the truth in the data. One can turn this selection process into an optimization problem where the strong temporal dependencies between primitive events and their spatial constraints are used to direct the optimization process.

Also, note that although two sequential events may overlap, their corresponding primitives should not. One or more embodiments of the invention define two sequential events $S=\{e_{t_1}^1, e_{t_2}^2, \ldots, e_{t_n}^m\}$ and $S'=\{e_{t'_1}^1, e_{t'_2}^2, \ldots, e_{t'_n}^m\}$ disjoint, or denoted $S \cap S' = \emptyset$, iff $$t_i < t'_i, \forall i = 1 \ldots n,$$

Similarly, a set of sequential events $S=\{S_1, S_2, \ldots, S_n\}$ is defined as disjoint if it satisfies:

$$\forall S_i, S_j \in S, S_{i \cap Sj} = \emptyset, i \neq j$$

Given the above definitions, the genuine sequential events of interest in the video can be considered as a set of disjoint repetitive actions. Thus, in the context of Bayesian modeling, one or more embodiments of the invention can include identifying the most likely disjoint subsequence within some kind of model that best explains the observations emitted by the genuine set of sequential events in the data. This is an optimization problem and can be mathematically formulated as follows, Let $S=\{S_1, S_2, \ldots, S\}$ be the set of sequential event candidates ordered by time. Find a maximum disjoint subsequence $\hat{S}$ within a model $M(\theta)$ such that $$\hat{S} = \operatorname*{argmax}_{\overline{S} \in D(S)} p(\overline{S} \mid \overline{O}, M(\theta))$$

where $D(S)$ is set of all possible disjoint subsequences of $S$ and $\overline{O}$ is the corresponding observation of $\overline{S}$.

The optimization of the above equation results in the maximized throughput of the target subject that invokes the events, which is encouraged in real-life scenarios (for example, an employee who processes items fast will tend to get rewarded).

The repetitive sequential events can be assumed to be a Markovian process. Based on the Bayes rule, one can obtain, $$p(\overline{S} \mid \overline{O}, M(\theta)) \propto p(\overline{O} \mid \overline{S}, M(\theta)) p(\overline{S} \mid M(\theta))$$
$$= p(S_1) p(O_1 \mid S_1) \prod_2^m p(O_i \mid S_i) p(S_1 \mid S_{i-1})$$

where m is the length of the event series $\overline{S}$. $p(O_i | S_i)$ can be further substituted, and $p(S_i | S_{i-i})$ is the transition probability between $S_i$ and $S_{i-1}$.

As described herein, the selection of model $M(\theta)$ depends on the specific problem under consideration.

Additionally, one or more embodiments of the invention include model inference and learning. The optimization problem described above seems intractable as the number of disjoint sequences grows exponentially with the number of sequential event candidates. However, a modified Viterbi algorithm can solve this problem efficiently.

Figure 5:
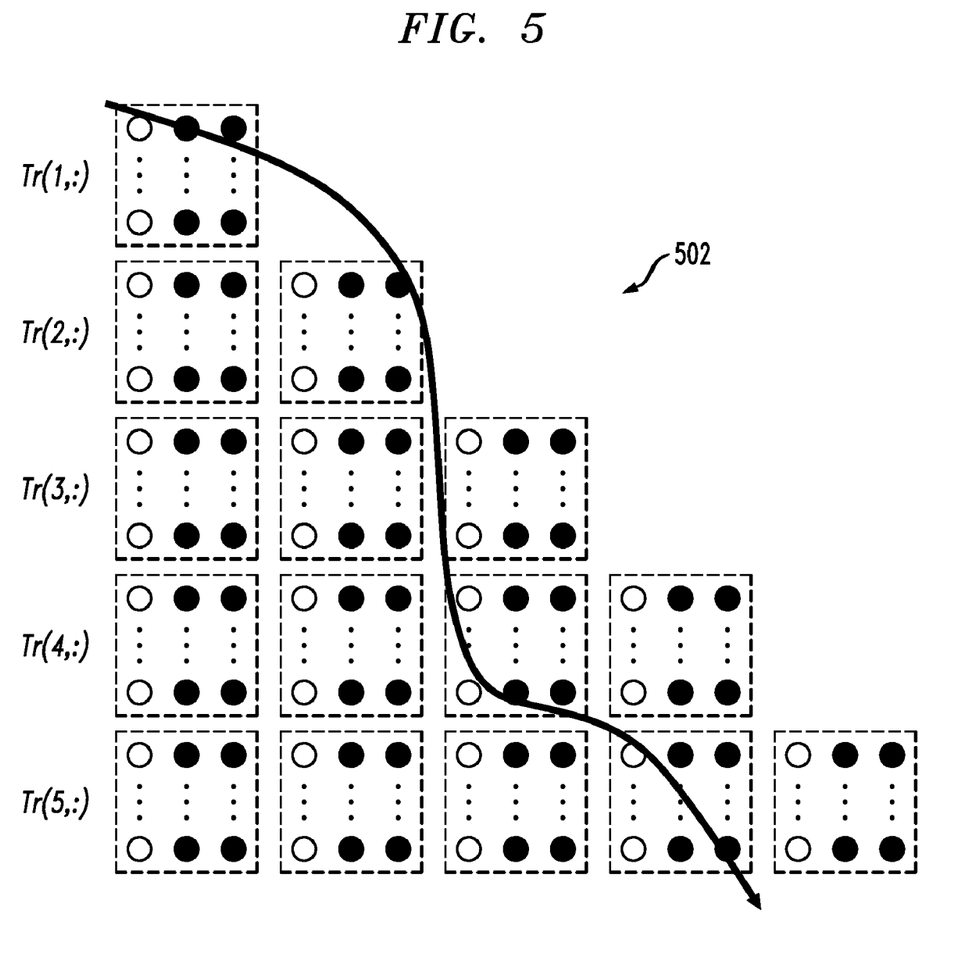
FIG. 5 is a diagram illustrating a modified Viterbi algorithm, according to an embodiment of the present invention.

One or more embodiments of the invention include constructing a lower-triangular trellis with each sequential event being a node, as illustrated in FIG. 5. The size of the trellis is n×l where n is the total number of sequential event candidates and l is the number of first primitives that correspond to the sequential event of interest. The construction embodies two important considerations: an event sequence is disjoint (lower-triangular), and the sequence is no longer than the number of first primitives detected (n columns). In addition, such a representation gives a path for any disjoint subsequences of the sequential events considered as there is a link between any two disjoint sequential events in this representation.

Each node has an observation score computed from the model, and each two disjoint nodes in adjacent columns are associated with a transition probability by the model. A search for the optimal path can be conducted in a similar way to a regular Viterbi algorithm, but only constraint paths with disjoint nodes are considered. Upon completion of the algorithm, each node is either isolated (no path to it), or set with the maximum likelihood resulting from an optimal sequence of events leading to that node. One can locate the last column with un-isolated nodes, and start from the node with maximum likelihood in that column and back-trace the optimal sequence of sequential events. Because a path to a node in the $j^{th}$ column has a length of j, the path that is identified is the most likely maximum disjoint subsequence that is pursued.

With model learning, one can rely on an HMM framework. A difference exists in that herein one considers just part of the state space while a regular HMM considers the entire space.

Also, one or more embodiments of the invention include using temporal models. Assuming that sequential events occur independently, the waiting time between two events can be modeled with the Erlang distribution, $$f(t; k, \lambda) = \frac{\lambda^k t^{k-1} e^{-\lambda t}}{(k-1)!} \text{ for } t > 0.$$

By way of example, k=1 as one may only be interested in the time gaps between consecutive visual scans. So $p(S_i | S_{i-1})$ can be simplified as an exponential distribution, $$p(S_i | S_{i-1}) = \lambda_s e^{-\lambda_s t}$$

where t is the time gap between $S_{i-1}$ and $S_i$.

The temporal dependencies between primitives, that is $p(e_{t_i} | e_{t_{i-1}})$, are also modeled by two separate exponential distributions $\lambda_e^1$ and $\lambda_e^2$. Note that the primitives of a visual scan follow each other closely, so $\lambda_e^1$ and $\lambda_e^2$ tend to be much larger than $\lambda_s$ in general.

One or more embodiments of the invention include, by way of example, detecting fake scans at a checkout. To catch a fake scan, one can visually identify scans in surveillance videos first, and then match them to the corresponding transaction log (TLOG). A visual scan can be considered as a process that the cashier picks up an item (pickup) from the lead-in belt, scans it in the scan area (scan) and then places the item onto the take-away belt (drop). As such, this process can be recognized by detecting the three different types of interactions (also referred to herein as primitive events) separately and then combining them into more complex visual scan events under time constraints by using the framework described herein.

As described herein, one or more embodiments of the invention identify segments in a video sequence as candidates for primitive events at a point of sale (POS) by, for example, using a motion-based segmentation algorithm. The algorithm locates motion peaks in the scan region, which are used to distinguish events in the adjacent regions. The separated event segments are refined by thresholding, with temporal length, magnitude of motion and motion patterns taken into account as well.

One can further apply spatio-temporal features to recognize true primitive events from the candidates and prune those falsely alarmed. In particular, one or more embodiments of the invention build location-aware event models by multiple-instance learning methodology detect primitives and the locations associated with the primitives.

Additionally, one or more embodiments of the invention include considering spatial constraints in the event combination. Actions invoked by a cashier are limited by the reach of the cashier's arm(s). Thus, knowing where the cashier is during the occurrence of an event can help disambiguate spurious events that do not make geometric sense. As such, one or more embodiments of the invention include building a geometric model to capture the distance between the cashier and the location of an event.

Let $l_{t_i}$ be the cashier's location when an event $e_{t_i}$ is invoked in the $k^{th}$ ROI centered at $r_k$. Then, the probability of an event appearing at location P is written as, $$p(l_{t_i}|e_{t_i}) \alpha N(x_{t_i}|\mu, \sigma)$$

where $x_{t_i} = \overline{l_{t_i} r_k}$, that is, the distance between the cashier and the location of the event. Note that the center of the ROI is only a rough approximation of the event location. By way of example, one can model pickup, scan and drop separately by using three Gaussian distributions under the assumption of independence.

The cashier's location can be detected by background subtraction. For example, an ellipse can be fitted to the contour of the largest blob obtained from background subtraction, and the center of the ellipse can be considered as the cashier's location.

As described herein, one or more embodiments of the invention validate an entire transaction process by combining primitive events according to temporal ordering constraints and spatial constraints. The combination problem can be formulated as an optimization problem and efficiently solved by a modified Viterbi algorithm. The results can be synchronized with the transaction log (TLOG) to flag sweet-hearting in surveillance videos and to allow further analysis of cashier behavior by integrating other clues such as the item size and color.

Figure 3:
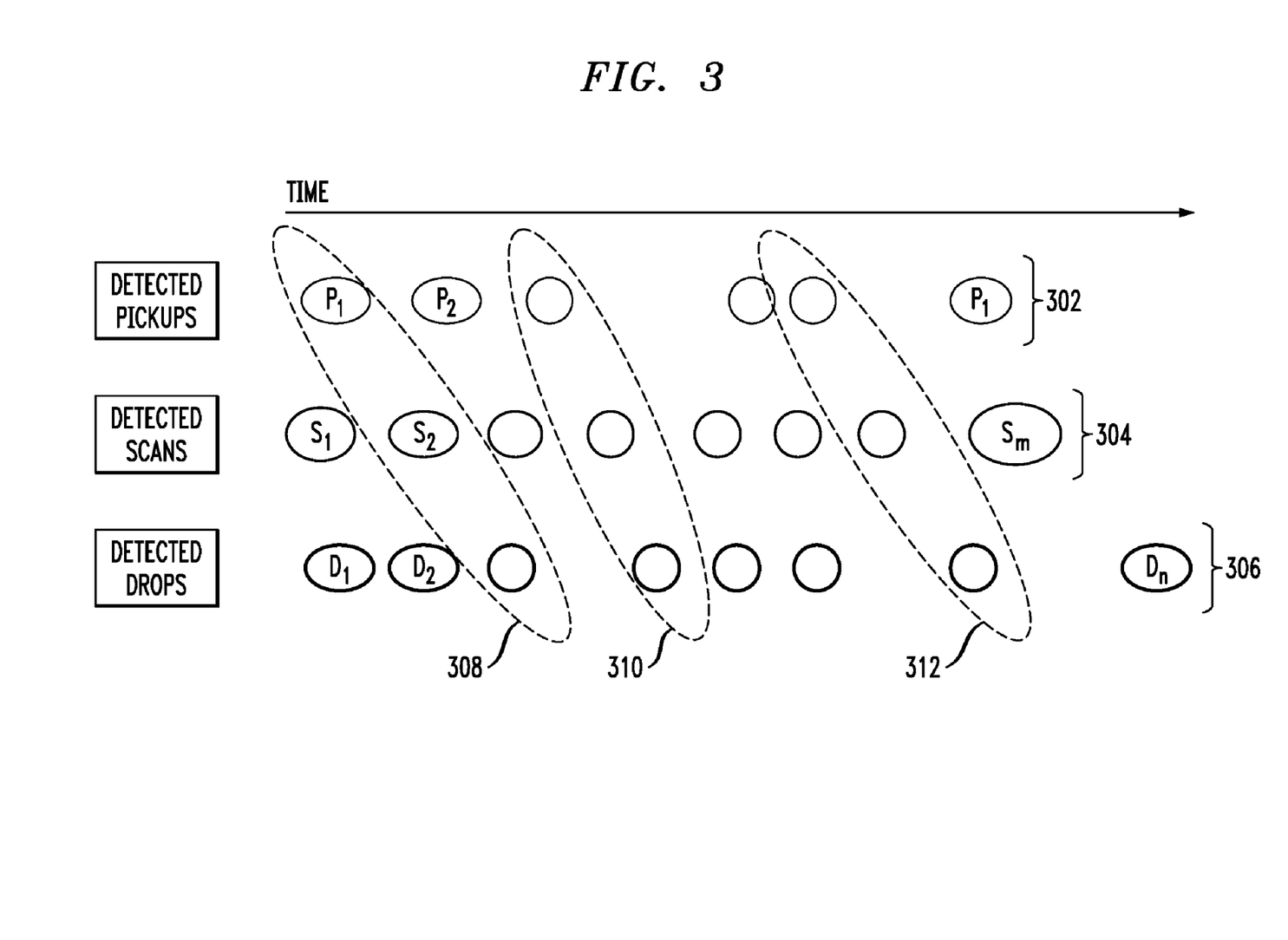
FIG. 3 is a diagram illustrating combining primitive events into high-level events, according to an embodiment of the present invention.

FIG. 3 is a diagram illustrating combining primitive events into high-level events, according to an embodiment of the present invention. By way of illustration, FIG. 3 depicts detected pickups 302, detected scans 304 and detected drops 306. A visual scan can be represented by a triplet of pickup, scan and drop such as illustrated in FIG. 3 by elements 308, 310 and 312. As described herein, one or more embodiments of the invention determine a maximum set of disjoint triplets that maximizes an objective function based on temporal constraints of the primitives. Further, as described below, pre-detected primitives can be combined into triplets that represent visual scans.

Figure 4:
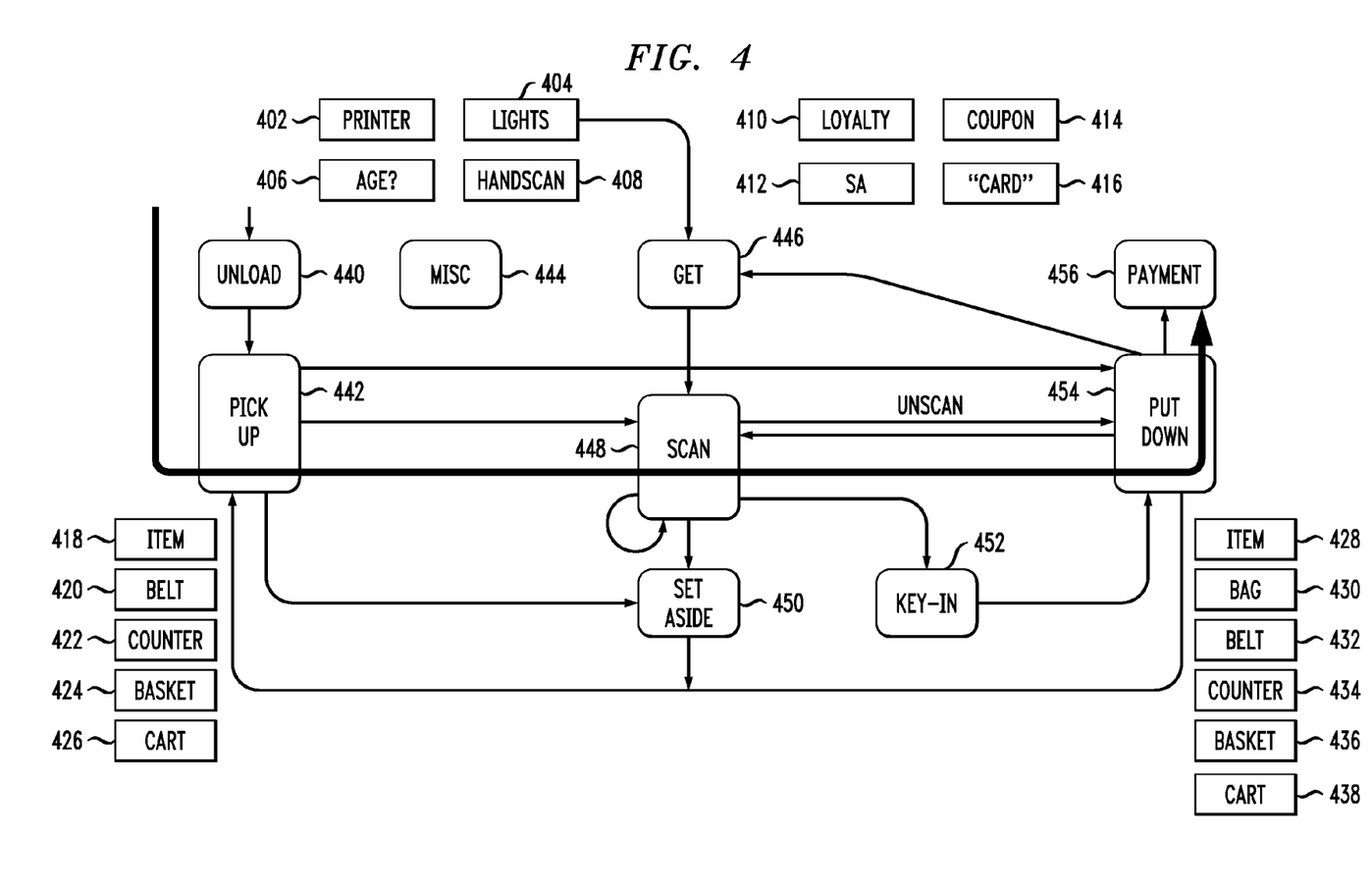
FIG. 4 is a diagram illustrating an exemplary retail checkout progression, according to an embodiment of the present invention.

FIG. 4 is a diagram illustrating an exemplary retail checkout progression, according to an embodiment of the present invention. By way of illustration, FIG. 4 depicts components such as a printer 402, lights 404, an age verification element 406, a hand-scan 408 and other miscellaneous elements 444 (for example, a hard-tag remover (often in apparel stores), a demagnetizer (high-end electronics stores), a radio-frequency identification (RFID) receiver, etc.). Also, at the beginning of the progression, a customer may unload in step 440 an item 418 onto a belt 420 or counter 422 from his or her basket 424 or cart 426, and a cashier or employee may pickup in step 442 the item 418 from the belt 420 or counter 420. The cashier or employee, at this stage, may also set aside an item in step 450.

Additionally, the cashier or employee, in step 446, may get a loyalty item 410, a shopper assistant (SA) card 412 (used, for example, in stores with self-checkout lanes), a coupon 414 and/or one or more types of cards 416 from the customer. The cashier or employee can also scan an item in step 448 and/or key-in information into the register in step 452. Further, in step 454, the cashier or employee can put down an item 428 onto a belt 432 or counter 434, and/or into a bag 430, a basket 436 and/or cart 438. Also, the cashier or employee can seek payment from the customer in step 456.

FIG. 5 is a diagram illustrating a modified Viterbi algorithm, according to an embodiment of the present invention. By way of illustration, FIG. 5 depicts a problem solved by a modified Viterbi algorithm 502. As depicted in FIG. 5, triplets are rearranged as a lower-triangular trellis. As described herein, $T_i$ can include a set of triplets starting from the $i^{th}$ pickup, and an edge can be added between two triplets $T_i$ and $T_j$ if $T_i$ and $T_j$ are disjoint. Also, computational complexity can include the following. l can indicate the number of pickups, m can indicate the number of scans, and n can indicate the number of drops. Running time can be determined as $(l*m*n)^2 \cdot l = l^3 * m^2 * n^2$.

Figure 6:
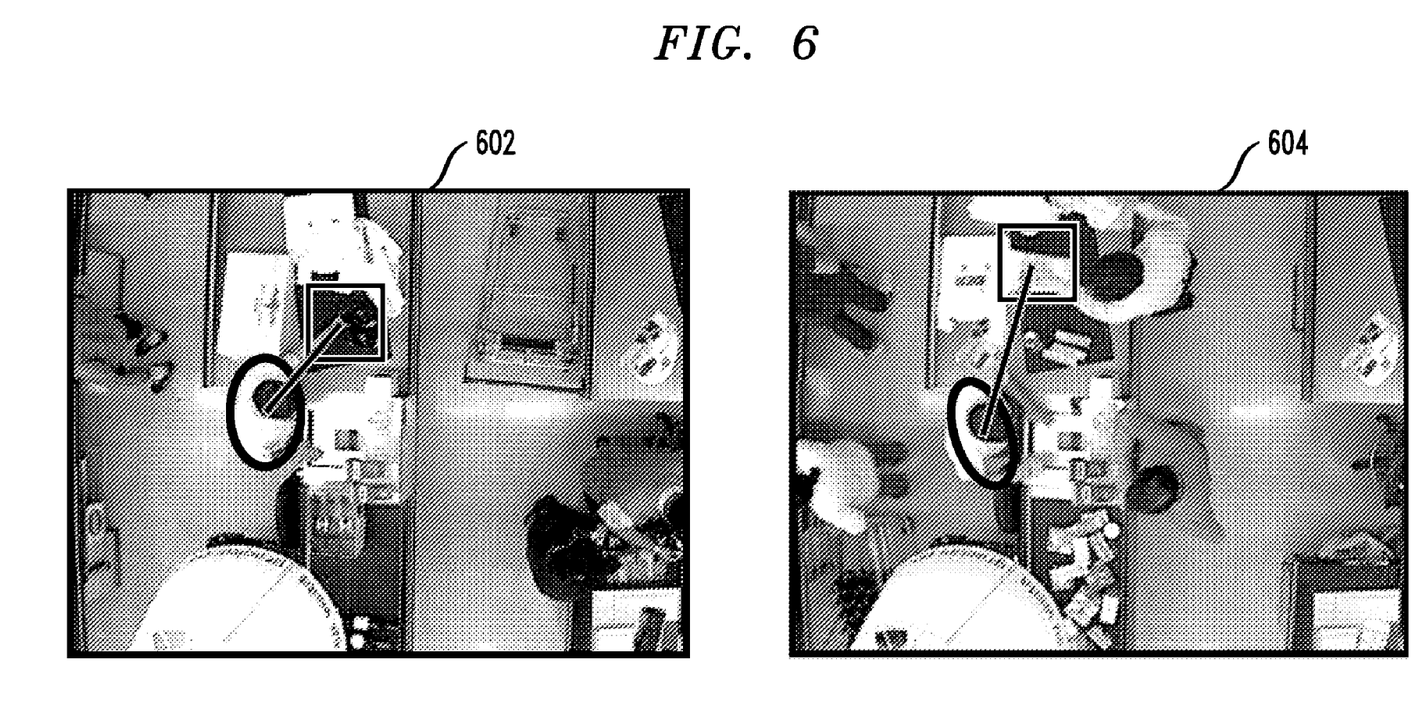
FIG. 6 is a diagram illustrating the spatial constraints imposed by a cashier on a retail checkout process, according to an embodiment of the present invention.

FIG. 6 is a diagram illustrating the spatial constraints imposed by a cashier on a retail checkout process, according to an embodiment of the present invention. By way of illustration, FIG. 6 depicts an image of a likely cashier hand-reach 602 as well as an image of an unlikely cashier hand-reach 604.

Figure 7:
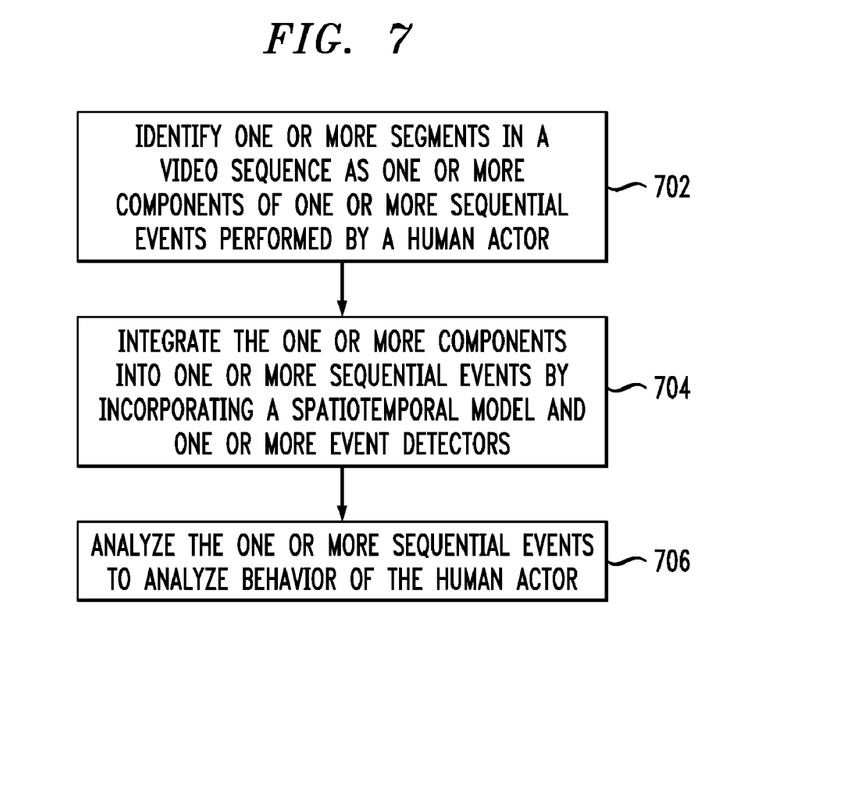
FIG. 7 is a flow diagram illustrating techniques for analyzing one or more sequential events performed by a human actor to analyze behavior of the human actor, according to an embodiment of the present invention.

FIG. 7 is a flow diagram illustrating techniques for analyzing one or more sequential events performed (for example, repeatedly performed) by a human actor to analyze behavior of the human actor, according to an embodiment of the present invention. Step 702 includes identifying one or more segments in a video sequence as one or more components of one or more sequential events performed by a human actor (for example, at a point-of-sale and/or at an assembly line). The events can include, for example, a cashier picking up an item, a cashier reading an item (via a scanner or weighing an item if it has no bar code) and a cashier placing an item in a take-away belt.

Also, identifying segments in a video sequence can include detecting motion at the point of sale, wherein the detected motion is used to distinguish the events in adjacent regions of the point of sale. Additionally, the separated event segments can be refined, for example, by thresholding, with temporal length, magnitude of motion and motion patterns taken into account as well.

Further, identifying segments in a video sequence can include dividing the point of sale into one or more areas, wherein the areas can include, for example, a lead-in area where a customer unloads merchandise, a scan area where merchandise is scanned by a cashier, and a take-away area where scanned merchandise is deposited. One or more embodiments of the invention also include placing a region of interest for each of the events (for example, in an unload, scan and exit area of the point of sale), obtaining motion pixels via frame differencing, counting the motion pixels in each region of interest for each frame, and normalizing the motion pixels by an area of each region of interest.

Step 704 includes integrating the one or more components into one or more sequential events by incorporating a spatiotemporal model and one or more event detectors. Integrating the events into sequential events can include synchronizing the events with a transaction log (for example, to flag sweet-hearting in surveillance videos and to allow further analysis of cashier behavior by integrating other cues such as, for example, the item size and the cashier's location.)

Step 706 includes analyzing the one or more sequential events to analyze behavior of the human actor.

The techniques depicted in FIG. 7 can also include applying one or more spatio-temporal features to recognize events, and to distinguish them, for example, from the candidates and prune those falsely alarmed. Further, one or more embodiments of the invention include using a modified Viterbi technique to analyze the sequential events (for example, to facilitate fraud prevention at the point of sale or product quality assurance at an assembly line).

Additionally, the techniques depicted in FIG. 7 can include, for example, locating a motion peak for each video sequence and using the motion peak as a divider to separate one or more events (for example, a merchandise pickup and a merchandise drop event). Also, one or more embodiments of the invention include, for each identified event, cutting-off a motion sequence over a threshold and assessing resulting sub-segments with regard to duration, magnitude and/or motion patterns.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 8:
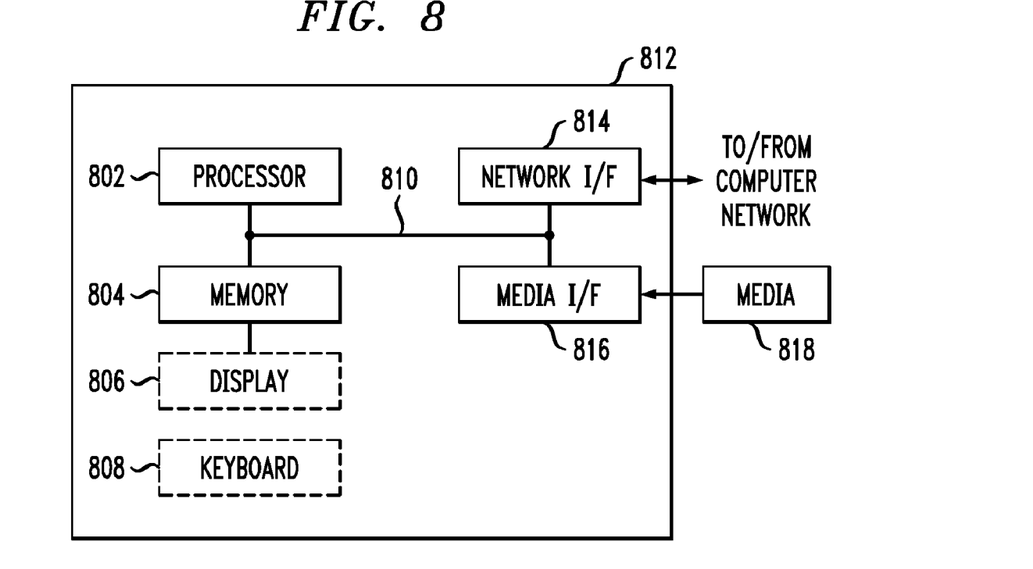
FIG. 8 is a system diagram of an exemplary computer system on which at least one embodiment of the present invention can be implemented.

At present, it is believed that the preferred implementation will make substantial use of software running on a general-purpose computer or workstation. With reference to FIG. 8, such an implementation might employ, for example, a processor 802, a memory 804, and an input and/or output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 802, memory 804, and input and/or output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 818, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 818) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 804), magnetic tape, a removable computer diskette (for example, media 818), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, fake-scan detection that maximizes the quantities and the quality of visual scans in a transaction.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for analyzing one or more sequential events performed by a human actor to analyze behavior of the human actor, comprising the steps of:
   identifying one or more segments in a video sequence as one or more components of one or more sequential events performed by a human actor, wherein identifying one or more segments in a video sequence comprises detecting motion at the point of sale, wherein the detected motion is used to distinguish the one or more events in one or more adjacent regions;
   integrating the one or more components into one or more sequential events by incorporating a spatiotemporal model and one or more event detectors; and
   analyzing the one or more sequential events to analyze behavior of the human actor.

2. The method of claim 1, wherein the one or more sequential events comprise one or more sequential events performed by a human actor at a point-of-sale.

3. The method of claim 2, wherein the one or more events comprise at least one of a cashier picking up an item from a lead-in belt, a cashier reading an item and a cashier placing an item on a take-away belt.

4. The method of claim 2, wherein identifying one or more segments in a video sequence comprises dividing the point of sale into one or more areas, wherein the one or more areas comprise a lead-in belt area where a customer unloads merchandise, a scan area where merchandise is scanned by a cashier, and a take-away belt area where scanned merchandise is deposited.

5. The method of claim 1, wherein the one or more sequential events comprise one or more sequential events performed by a human actor at an assembly line.

6. The method of claim 1, further comprising using a modified Viterbi technique to analyze the one or more sequential events.

7. The method of claim 1, wherein integrating the one or more events into one or more sequential events comprises synchronizing the one or more events with a transaction log.

8. The method of claim 1, wherein identifying one or more segments in a video sequence comprises:
   placing a region of interest for each of the one or more events;
   obtaining one or more motion pixels via frame differencing;
   counting the one or more motion pixels in each region of interest for each frame; and
   normalizing the one or more motion pixels by an area of each region of interest.

9. The method of claim 8, further comprising:
   locating a motion peak for each video sequence; and
   using the motion peak as a divider to separate one or more events.

10. The method of claim 1, further comprising:
    for each identified event, cutting-off a motion sequence over a threshold; and
    assessing one or more resulting sub-segments with regard to at least one of duration, magnitude and one or more motion patterns.

11. The method of claim 1, further comprising resolving an overlap issue among one or more events by searching one or more sequential events without overlap.

12. A computer program product comprising a computer readable medium having computer readable program code for analyzing one or more sequential events performed by a human actor to analyze behavior of the human actor, said computer program product including:
    computer readable program code for identifying one or more segments in a video sequence as one or more components of one or more sequential events performed by a human actor, wherein identifying one or more segments in a video sequence comprises detecting motion at the point of sale, wherein the detected motion is used to distinguish the one or more events in one or more adjacent regions;
    computer readable program code for integrating the one or more components into one or more sequential events by incorporating a spatiotemporal model and one or more event detectors; and
    computer readable program code for analyzing the one or more sequential events to analyze behavior of the human actor.

13. The computer program product of claim 12, wherein the one or more sequential events comprise one or more sequential events performed by a human actor at a point-of-sale.

14. The computer program product of claim 13, wherein the one or more events comprise at least one of a cashier picking up an item from a lead-in belt, a cashier reading an item and a cashier placing an item on a take-away belt.

15. The computer program product of claim 12, wherein the one or more sequential events comprise one or more sequential events performed by a human actor at an assembly line.

16. The computer program product of claim 12, further comprising computer readable program code for using a modified Viterbi technique to analyze the one or more sequential events.

17. A system for analyzing one or more sequential events performed by a human actor to analyze behavior of the human actor, comprising:
    a memory; and
    at least one processor coupled to said memory and operative to:
    identify one or more segments in a video sequence as one or more components of one or more sequential events performed by a human actor, wherein identifying one or more segments in a video sequence comprises detecting motion at the point of sale, wherein the detected motion is used to distinguish the one or more events in one or more adjacent regions;
    integrate the one or more components into one or more sequential events by incorporating a spatiotemporal model and one or more event detectors; and
    analyze the one or more sequential events to analyze behavior of the human actor.

18. The system of claim 17, wherein the one or more sequential events comprise one or more sequential events performed by a human actor at a point-of-sale.

19. The system of claim 18, wherein in identifying one or more segments in a video sequence, the at least one processor coupled to said memory is further operative to divide the point of sale into one or more areas, wherein the one or more areas comprise a lead-in belt area where a customer unloads merchandise, a scan area where merchandise is scanned by a cashier, and a take-away belt area where scanned merchandise is deposited.

20. The system of claim 17, wherein the one or more sequential events comprise one or more sequential events performed by a human actor at an assembly line.

21. The system of claim 17, wherein the at least one processor coupled to said memory is further operative to use a modified Viterbi technique to analyze the one or more sequential events.

22. An apparatus for analyzing one or more sequential events performed by a human actor to analyze behavior of the human actor, said apparatus comprising:

means for identifying one or more segments in a video sequence as one or more components of one or more sequential events performed by a human actor, wherein identifying one or more segments in a video sequence comprises detecting motion at the point of sale, wherein the detected motion is used to distinguish the one or more events in one or more adjacent regions;

means for integrating the one or more components into one or more sequential events by incorporating a spatiotemporal model and one or more event detectors; and means for analyzing the one or more sequential events to analyze behavior of the human actor.

* * * * *